(12) United States Patent
Hai

(10) Patent No.: US 10,598,982 B2
(45) Date of Patent: Mar. 24, 2020

(54) LIQUID CRYSTAL DISPLAY SCREEN

(71) Applicant: HUIZHOU CHINA STAR OPTOELECTRONICS TECHNOLOGY CO., LTD., Huizhou Guangdong (CN)

(72) Inventor: Bo Hai, Guangdong (CN)

(73) Assignee: HUIZHOU CHINA STAR OPTOELECTRONICS TECHNOLOGY CO., LTD., Huizhou (CN)

( * ) Notice: Subject to any disclaimer, the term of this patent is extended or adjusted under 35 U.S.C. 154(b) by 63 days.

(21) Appl. No.: 15/985,989

(22) Filed: May 22, 2018

(65) Prior Publication Data

US 2019/0196258 A1  Jun. 27, 2019

Related U.S. Application Data

(63) Continuation of application No. PCT/CN2018/074831, filed on Jan. 31, 2018.

(30) Foreign Application Priority Data

Dec. 27, 2017 (CN) .......................... 2017 1 1448604

(51) Int. Cl.
*G02F 1/1335* (2006.01)
*G02F 1/13363* (2006.01)
*G02F 1/1362* (2006.01)

(52) U.S. Cl.
CPC ...... *G02F 1/133528* (2013.01); *G02F 1/1362* (2013.01); *G02F 1/13363* (2013.01);
(Continued)

(58) Field of Classification Search
CPC ... G02F 1/133528; G02F 2001/133541; G02F 1/13363; G02F 2001/133638; G02F 1/136286
See application file for complete search history.

(56) References Cited

U.S. PATENT DOCUMENTS

2003/0218715 A1* 11/2003 Okawa ..................... G02B 1/08
349/194
2006/0238867 A1* 10/2006 Takeda ................. G02B 27/288
359/485.02
(Continued)

FOREIGN PATENT DOCUMENTS

CN 101833198 A 9/2010
CN 102650778 A 8/2012
(Continued)

*Primary Examiner* — Jia X Pan
(74) *Attorney, Agent, or Firm* — Hemisphere Law, PLLC; Zhigang Ma

(57) ABSTRACT

The present disclosure provides a LCD screen, including a liquid crystal panel, a first functional layer disposed on an array substrate of the liquid crystal panel, a quarter-wave plate and a polarizing layer sequentially stacked on the first functional layer, wherein the array substrate has a metal wire that reflects ambient light sequentially passing through the polarizing layer, the quarter-wave plate and the first functional layer and striking the surface of the metal wire; an included angle is between the optical axis of the quarter-wave plate and the absorption axis of the polarizing layer so as to block the ambient light reflected by the metal wire in the polarizing layer. The angle between the optical axis of the quarter-wave plate and the absorption axis of the polarizing layer of the present disclosure is 30-60°, so that the ambient light entering the polarizing layer is blocked in the polarizing layer.

10 Claims, 2 Drawing Sheets

(52) U.S. Cl.
CPC .. *G02F 1/133502* (2013.01); *G02F 1/133514* (2013.01); *G02F 1/136286* (2013.01); *G02F 2001/133541* (2013.01); *G02F 2001/133562* (2013.01); *G02F 2001/133638* (2013.01)

(56) References Cited

U.S. PATENT DOCUMENTS

| | | | | |
|---|---|---|---|---|
| 2007/0029550 A1* | 2/2007 | Yoshida | ................ | G02F 1/1393 257/59 |
| 2009/0002580 A1* | 1/2009 | Matsushima | ....... | G02F 1/13338 349/12 |
| 2014/0375933 A1* | 12/2014 | Park | ................... | G02F 1/133502 349/96 |
| 2015/0378075 A1* | 12/2015 | Gam | ................... | G02B 5/3016 349/194 |
| 2017/0299785 A1* | 10/2017 | Saitoh | ................... | G02B 5/305 |

FOREIGN PATENT DOCUMENTS

| | | |
|---|---|---|
| CN | 102652778 A | 9/2012 |
| CN | 105954917 A | 9/2016 |
| JP | 2010-26091 A | 2/2010 |
| JP | 2011-170082 A | 9/2011 |
| KR | 10-2004-0005040 A | 1/2004 |

\* cited by examiner

LIQUID CRYSTAL DISPLAY SCREEN

RELATED APPLICATIONS

This application is a continuation application of PCT Patent Application No. PCT/CN2018/074831, filed Jan. 31, 2018, which claims the priority benefit of Chinese Patent Application No. CN 201711448604.2, filed Dec. 27, 2017, which is herein incorporated by reference in its entirety.

FIELD OF THE DISCLOSURE

The present disclosure relates to a display technology field, and more particularly to a liquid crystal display screen.

BACKGROUND OF THE DISCLOSURE

At present, there is no border LCD TV frame because there is no border, using thin-film transistor facing the program, resulting in thin-film transistor side of the reflective wire serious, and with the increase of resolution of LCD TVs, the number of metal wires is also increasing, and the degree of reflection of metal wires is also increasing. The general reflection scheme has been unable to effectively reduce the reflected light.

SUMMARY OF THE DISCLOSURE

The object of the present disclosure is to provide a liquid crystal display which realizes the technical effect of improving the resolution of the liquid crystal display.

The present disclosure provides a liquid crystal display screen, including a liquid crystal panel, a first functional layer disposed on an array substrate of the liquid crystal panel, a quarter-wave plate and a polarizing layer sequentially stacked on the first functional layer, wherein the array substrate has a metal wire that reflects ambient light sequentially passing through the polarizing layer, the quarter-wave plate and the first functional layer and striking the surface of the metal wire; the included angle is between the optical axis of the quarter-wave plate and the absorption axis of the polarizing layer so as to block the ambient light reflected by the metal wire in the polarizing layer.

Further, the included angle between the optical axis of the quarter-wave plate and the absorption axis of the polarizing layer is 30-60°.

Further, the included angle between the optical axis of the quarter-wave plate and the absorption axis of the polarizing layer is 45°.

Further, the included angle between the optical axis of the quarter-wave plate and the absorption axis of the polarizing layer is 120-150°.

Further, the included angle between the optical axis of the quarter-wave plate and the absorption axis of the polarizing layer is 135°.

Further, the quarter-wave plate has a wavelength of 500-600 nm for aluminum.

Further, the quarter-wave plate has a wavelength of 540-560 nm for aluminum.

Further, the quarter-wave plate has a wavelength of 550-650 nm for copper.

Further, the quarter-wave plate has a wavelength of 580-600 nm for copper.

Further, the liquid crystal panel includes a color filter substrate opposite to the array substrate, a second functional layer is disposed on a surface of the color filter substrate facing away from the array substrate, and the first functional layer and the second functional layer are respectively disposed at two opposite sides of the liquid crystal panel.

The included angle between the optical axis of the quarter-wave plate of the liquid crystal display screen of the present disclosure and the absorption axis of the polarizing layer is 30-60° or 120-150°. It is achieved that the ambient light entering the polarizing layer becomes the first linearly polarized light, the first linearly polarized light enters the quarter-wave plate and becomes the first circularly polarized light; the first circularly polarized light passes through the first functional layer and is reflected by the metal wire to become a second circularly polarized light, the second circularly polarized light passes through the first functional layer and the quarter-wave plate and then becomes a second linearly polarized light perpendicular to the first linearly polarized light, thereby blocking the light in the polarizing layer, preventing the ambient light from exiting, and achieving the technical effect of reducing the strong reflection of the ambient light by the metal wires of the thin film transistor in the liquid crystal display screen, thereby improving the resolution of the liquid crystal display screen.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show merely some embodiments of the present disclosure, and a person of ordinary skill in the art may still derive other drawings from these accompanying drawings without creative efforts.

DETAILED DESCRIPTION OF PREFERRED EMBODIMENTS

Figure 1:
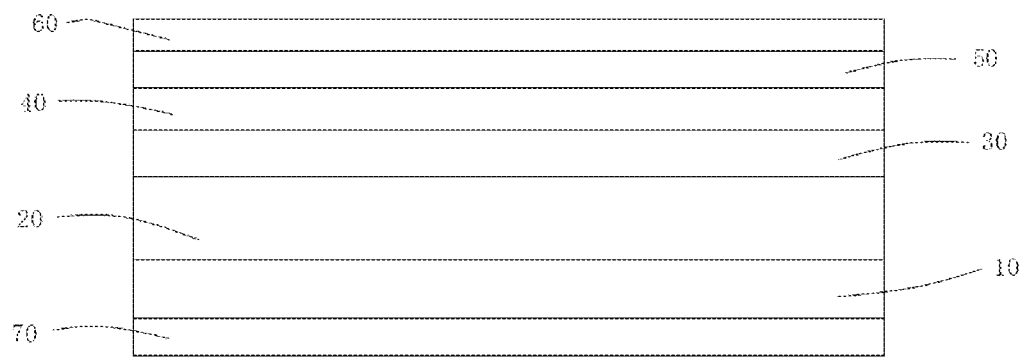
FIG. 1 is a schematic diagram of the internal planar structure of a liquid crystal display provided by an embodiment of the present disclosure.
Figure 2:
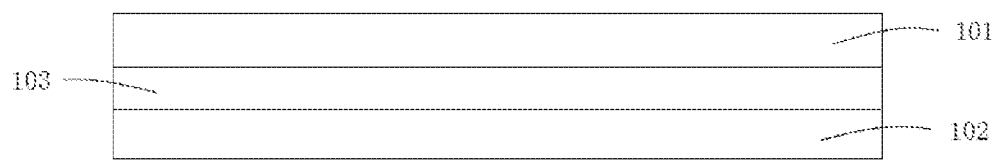
FIG. 2 is a schematic diagram of the internal planar structure of the display panel in FIG. 1.

Referring to FIG. 1 and FIG. 2, the present disclosure provides a liquid crystal display screen including a liquid crystal panel 10, a first functional layer 20 is disposed on the array substrate 101 of the liquid crystal panel 10. A quarter-wave plate 30 and a first polarizer 40 are sequentially stacked on the first functional layer 20. The array substrate 101 has metal wires, the metal wire reflects the ambient light sequentially passing through the first polarizing layer 40, the quarter-wave plate 30 and the first functional layer 20 and striking the surface of the metal wire; an angle between the optical axis of the quarter-wave plate 30 and the absorption axis of the first polarizer layer is used to block the ambient light reflected by the metal wire in the first polarizer layer.

Referring to FIG. 2, the liquid crystal panel 10 further includes a color filter substrate 102 and a liquid crystal 103 disposed between the color filter substrate 102 and the array substrate 101. A thin film transistor is disposed on the array substrate 101. The thin film transistor has metal wires and metal electrodes.

In the present embodiment, the included angle between the optical axis of the quarter-wave plate 30 and the absorption axis of the first polarizer 40 is 30-60°, and preferably 45°. After the incident ambient light passes through the first polarizing layer 40, it becomes the first linearly polarized light, the first linear polarized light forms the first circularly polarized light through the quarter-wave plate 30 disposed at an angle of 30-60° with the first polarizing layer 40, the first circularly polarized light passes through the first functional layer 20 and is reflected by the metal wires of the thin film transistor to form second circularly polarized light, the second circularly polarized light passes through the first functional layer 20 and the quarter-wave plate 30 to form a second linearly polarized light perpendicular to the first linearly polarized light. Thereby being blocked in the first polarizing layer 40, preventing the ambient light from exiting, and achieving the technical effect of reducing the strong reflection of the ambient light by the metal wires of the thin film transistor in the liquid crystal display screen, thereby improving the resolution of the liquid crystal display screen.

Please refer to FIG. 1, the protective layer 50 and the second surface treatment layer 60 are sequentially stacked on the first polarizing layer 40. The liquid crystal display further includes a second functional layer 70 disposed on a surface of the color filter substrate 102 facing away from the array substrate 101. Furthermore, the first functional layer 20 and the second functional layer 70 are respectively located at two opposite sides of the liquid crystal panel 10.

Figure 3:
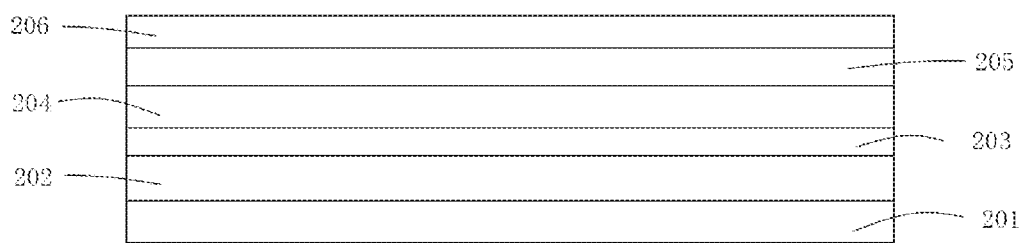
FIG. 3 is a schematic diagram of the internal planar structure of the first functional layer in FIG. 1.

Please refer to FIG. 3, the first functional layer 20 includes a first adhesive layer 201, a first compensation layer 202, a second polarizing layer 203, a first passivation layer 204, a first surface treatment layer 205, and a second adhesive layer 206 that are sequentially stacked.

Figure 4:
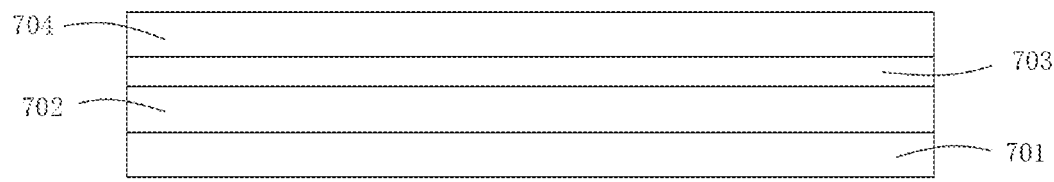
FIG. 4 is a schematic diagram of the internal planar structure of the second functional layer in FIG. 1.

Please refer to FIG. 4, the second functional layer 70 includes a second protective layer 701, a third polarizing layer 702, a second compensation layer 703, and a third adhesive layer 704 that are sequentially stacked. The third adhesive layer 704 is connected to the color filter substrate 102.

Figure 6:
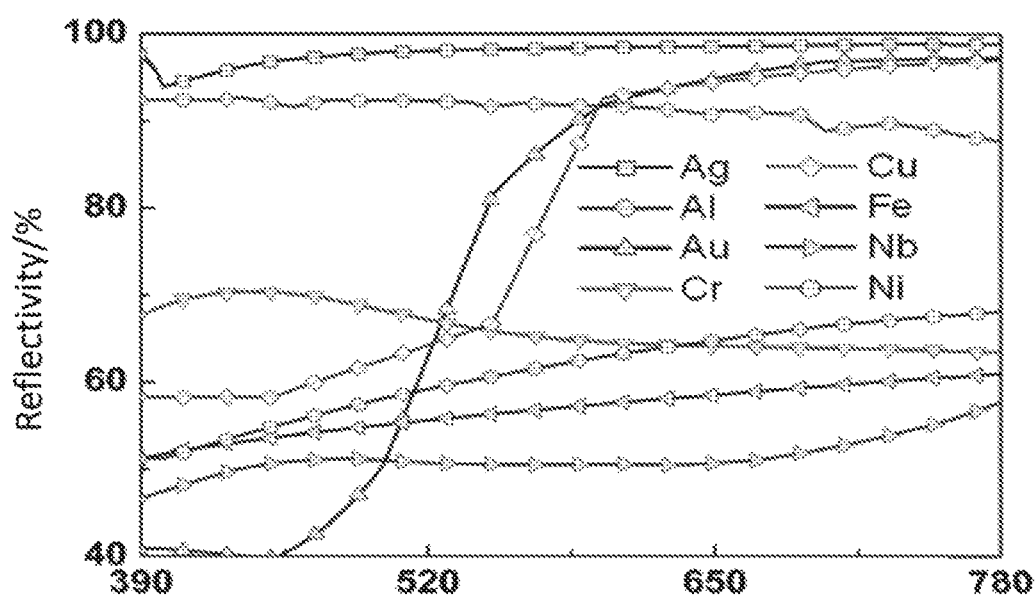
FIG. 6 is a refractive index of visible light of a metal wire provided by an embodiment of the present disclosure.

Please refer to FIG. 6, when the material of the metal wire of the thin film transistor is aluminum, aluminum has a reflectivity of 90% over the entire wavelength range of visible light, so the wavelength range of the quarter-wave plate 30 to be designed for green light is 500-600 nm, preferably 540-560 nm, so as to reduce the refraction of the green light in the quarter-wave plate 30 and reduce the amount of light reaching the first polarizing layer 40, so as to improve the resolution of the liquid crystal display screen; when the material of the metal wire of the thin film transistor is copper, since the reflectance of copper to blue light is low and the reflectance of red light and green light is high. Therefore, the wavelength range of the quarter-wave plate 30 to be designed for the yellow light superimposed with the red light and the green light is 550-650 nm, preferably 580-600 nm, so as to reduce the refraction of the red and green light in the quarter-wave plate 30 and reduce the amount of light reaching the first polarizer, so as to improve the resolution of the liquid crystal display.

In the second embodiment of the present disclosure, the included angle between the optical axis of the quarter-wave plate 30 and the absorption axis of the first polarizer 40 is 30-60°, and preferably 45°. After the incident ambient light passes through the first polarizing layer 40, it becomes the first linearly polarized light, the first linear polarized light forms the first circularly polarized light through the quarter-wave plate 30 disposed at an angle of 30-60° with the first polarizing layer 40, the first circularly polarized light passes through the first functional layer 20 and is reflected by the metal wires of the thin film transistor to form second circularly polarized light, the second circularly polarized light passes through the first functional layer 20 and the quarter-wave plate 30 to form a second linearly polarized light perpendicular to the first linearly polarized light, thereby being blocked in the first polarizing layer 40, preventing the ambient light from exiting, and achieving the technical effect of reducing the strong reflection of the ambient light by the metal wires of the thin film transistor in the liquid crystal display screen, thereby improving the resolution of the liquid crystal display screen.

Please refer to FIG. 1, the protective layer 50 and the second surface treatment layer 60 are sequentially stacked on the first polarizing layer 40. The liquid crystal display further includes a second functional layer 70 disposed on a surface of the color filter substrate 102 facing away from the array substrate 101. Furthermore, the first functional layer 20 and the second functional layer 70 are respectively located at two opposite sides of the liquid crystal panel 10.

Figure 5:
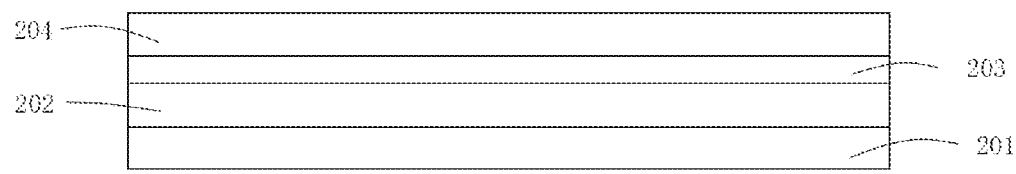
FIG. 5 is a schematic diagram of the internal planar structure of another structure of the first functional layer in FIG. 1.

Please refer to FIG. 5. In this embodiment, the first functional layer 20 includes a first adhesive layer 201, a first compensation layer 202 and a second polarizer layer 203 which are sequentially stacked. The first protective layer 204, the first surface treatment layer 205 and the second glue layer 206 in the first embodiment are canceled, so that the second polarizing layer 203 and the quarter-wave plate 30 are merged to not only reduce the thickness of the first functional layer 20 but also reduce the manufacturing cost. Also reduce the difficulty of the process, just affixed a polarizing layer, improve the production yield.

Please continue to refer to FIG. 4, the second functional layer 70 includes a second protective layer 701, a third polarizing layer 702, a second compensation layer 703 and a third adhesive layer 704 that are sequentially stacked. The third adhesive layer 704 is connected to the color filter substrate 102.

Referring to FIG. 6, when the material of the metal wire of the thin film transistor is aluminum, aluminum has a reflectivity of 90% over the whole wavelength range of visible light. Therefore, the wavelength of the quarter-wave plate 30 to be designed for green light should be in a range of 500-600 nm, preferably 540-560 nm, so as to reduce the refraction of the green light in the quarter-wave plate 30 and reduce the amount of light reaching the first polarizing layer 40, so as to improve the resolution of the liquid crystal display screen; when the material of the metal wire of the thin film transistor is copper, since the reflectance of copper to blue light is low and the reflectance of red light and green light is high, therefore, the wavelength range of the quarter-wave plate 30 that needs to be designed for the yellow light superimposed with the red light and the green light is 550-650 nm, preferably 580-600 nm. The reduction of the red and green light refractions at the quarter-wave plate 30 and the decrease of the light reaching the first polarizing layer 40 are achieved, thereby improving the resolution of the liquid crystal display screen.

In the third embodiment of the present disclosure, the included angle between the optical axis of the quarter-wave plate 30 and the absorption axis of the first polarizing layer 40 is 120-150°, and preferably 135°. After the incident ambient light passes through the first polarizing layer 40, it becomes the first linearly polarized light, the first linearly polarized light forms the first circularly polarized light through the quarter-wave plate 30 disposed at an angle of 120-150° with the first polarizer 40, the first circularly polarized light passes through the first functional layer 20 and is reflected by the metal wires of the thin film transistor to form second circularly polarized light, the second circularly polarized light passes through the first functional layer 20 and the quarter-wave plate 30 to form a second linearly polarized light perpendicular to the first linearly polarized light, thereby being blocked in the first polarizing layer 40 to reduce the emission of the ambient light and achieve the technical effect of reducing the strong reflection of the ambient light by the metal wires of the thin film transistor in the liquid crystal display panel and improving the resolution of the liquid crystal display screen.

Please refer to FIG. 1, the protective layer 50 and the second surface treatment layer 60 are laminated on the first polarizer 40. The liquid crystal display further includes a second functional layer 70 disposed on a surface of the color filter substrate 102 facing away from the array substrate 101. Furthermore, the first functional layer 20 and the second functional layer 70 are respectively located at two opposite sides of the liquid crystal panel 10.

Please continue to refer to FIG. 3, the first functional layer 20 includes a first adhesive layer 201, a first compensation layer 202, a second polarizing layer 203, a first passivation layer 204, a first surface treatment layer 205, and a second adhesive layer 206 that are sequentially stacked.

Referring to FIG. 4, the second functional layer 70 includes a second protective layer 701, a third polarizer layer 702, a second compensation layer 703 and a third adhesive layer 704 stacked in sequence. The third adhesive layer 704 is connected to the color filter substrate 102.

Please refer to FIG. 6, when the material of the metal wire of the thin film transistor is aluminum, aluminum has a reflectivity of 90% in the whole wavelength range of visible light, so the wavelength range of the quarter-wave plate 30 to be designed for green light is 500-600 nm, preferably 540-560 nm, so as to reduce the refraction of the green light in the quarter-wave plate 30 and reduce the amount of light reaching the first polarizing layer 40, so as to improve the resolution of the liquid crystal display panel; when the material of the metal wire of the thin film transistor is copper, since the reflectance of copper to blue light is low and the reflectance of red light and green light is high, therefore, the wavelength range of the quarter-wave plate 30 to be designed for the yellow light superimposed with the red light and the green light is 550-650 nm, preferably 580-600 nm, so as to reduce the refraction of the red and green light in the quarter-wave plate 30 and reduce the amount of light reaching the first polarizer 40, so as to improve the resolution of the liquid crystal display.

In the fourth embodiment of the present disclosure, the included angle between the optical axis of the quarter-wave plate 30 and the absorption axis of the first polarizer 40 is 120-150°, and preferably 135°. After the incident ambient light passes through the first polarizing layer 40, it becomes the first linearly polarized light, the first linearly polarized light forms the first circularly polarized light through the quarter-wave plate 30 disposed at an angle of 120-150° with the first polarizer 40, the first circularly polarized light passes through the first functional layer 20 and is reflected by the metal wires of the thin film transistor to form second circularly polarized light, the second circularly polarized light passes through the first functional layer 20 and the quarter-wave plate 30 to form a second linearly polarized light perpendicular to the first linearly polarized light, thereby being blocked in the first polarizing layer 40 to reduce the emission of the ambient light and achieve the technical effect of reducing the strong reflection of the ambient light by the metal wires of the thin film transistor in the liquid crystal display panel and improving the resolution of the display panel 10.

Please refer to FIG. 5, in the present embodiment, the first functional layer 20 includes a first adhesive layer 201, a first compensation layer 202 and a second polarizing layer 203 which are sequentially stacked, the first passivation layer 204, the first surface treatment layer 205 and the second adhesive layer 206 in the third embodiment are eliminated, so that the second polarizing layer 203 and the quarter-wave plate 30 are merged to not only reduce the thickness of the first functional layer 20 but also reduce the manufacturing cost. Also reduces the difficulty of making, just affixed a polarizing layer, improve the yield of production.

Please refer to FIG. 1, the protective layer 50 and the second surface treatment layer 60 are laminated on the first polarizer 40. The liquid crystal display further includes a second functional layer 70 disposed on a surface of the color filter substrate 102 facing away from the array substrate 101. Furthermore, the first functional layer 20 and the second functional layer 70 are respectively located at two opposite sides of the liquid crystal panel 10.

Please continue to refer to FIG. 4, the second functional layer 70 includes a second protective layer 701, a third polarizer layer 702, a second compensation layer 703 and a third adhesive layer 704 stacked in sequence. the third adhesive layer 704 is connected to the color filter substrate 102.

Please continue to refer to FIG. 6, when the material of the metal wire of the thin film transistor is aluminum, aluminum has a reflectivity of 90% in the whole wavelength range of visible light, so the wavelength range of the quarter-wave plate 30 to be designed for green light is 500-600 nm, preferably 540-560 nm, so as to reduce the refraction of the green light in the quarter-wave plate 30 and reduce the amount of light reaching the first polarizing layer 40, so as to improve the resolution of the liquid crystal display panel; when the material of the metal wire of the thin film transistor is copper, aluminum-copper has low reflectance of blue light and high reflectance of red light and green light, therefore, the wavelength range of the quarter-wave plate 30 to be designed for the yellow light superimposed with the red light and the green light is 550-650 nm, preferably 580-600 nm, so as to reduce the refraction of the red and green light in the quarter-wave plate 30 and reduce the amount of light reaching the first polarizing layer 40, so as to improve the resolution of the liquid crystal display screen.

The above disclosure is only the preferred embodiments of the present disclosure, and certainly can not be used to limit the scope of the present disclosure. People of ordinary skill in the art may understand that all or part of the procedures for implementing the foregoing embodiments and equivalent changes made according to the claims of the present disclosure still fall within the scope of the present disclosure.

What is claimed is:

1. A liquid crystal display screen, comprising a liquid crystal panel, a first functional layer disposed on an array substrate of the liquid crystal panel, a quarter-wave plate and a first polarizing layer sequentially stacked on the first functional layer, wherein the array substrate has a metal wire, the metal wire reflects ambient light sequentially passing through the first polarizing layer, the quarter-wave plate and the first functional layer and striking a surface of the metal wire; an included angle is between an optical axis of the quarter-wave plate and an absorption axis of the first polarizing layer so as to block the ambient light reflected by the metal wire in the first polarizing layer, wherein the first functional layer comprises an adhesive layer, a compensation layer and a second polarizing layer which are sequentially stacked, and the second polarizing layer is merged with the quarter-wave plate.

2. The liquid crystal display screen according to claim 1, wherein the included angle between the optical axis of the quarter-wave plate and the absorption axis of the first polarizing layer is 30-60°.

3. The liquid crystal display screen according to claim 2, wherein the included angle between the optical axis of the quarter-wave plate and the absorption axis of the first polarizing layer is 45°.

4. The liquid crystal display screen according to claim 1, wherein the included angle between the optical axis of the quarter-wave plate and the absorption axis of the first polarizing layer is 120-150°.

5. The liquid crystal display screen according to claim 4, wherein the included angle between the optical axis of the quarter-wave plate and the absorption axis of the first polarizing layer is 135°.

6. The liquid crystal display screen according to claim 1, wherein the quarter-wave plate has a wavelength of 500-600 nm for aluminum.

7. The liquid crystal display screen according to claim 6, wherein the quarter-wave plate has a wavelength of 540-560 nm for aluminum.

8. The liquid crystal display screen according to claim 1, wherein the quarter-wave plate has a wavelength of 550-650 nm for copper.

9. The liquid crystal display screen according to claim 8, wherein the quarter-wave plate has a wavelength of 580-600 nm for copper.

10. The liquid crystal display screen according to claim 1, wherein the liquid crystal panel comprises a color filter substrate opposite to the array substrate, a second functional layer is disposed on a surface of the color filter substrate facing away from the array substrate, and the first functional layer and the second functional layer are respectively disposed at two opposite sides of the liquid crystal panel.

* * * * *